United States Patent [19]

Umeda et al.

[11] 4,066,143
[45] Jan. 3, 1978

[54] VEHICLE WITH ROTATING CAB

[75] Inventors: Haruhiko Umeda; Hiroshi Ito, both of Yokohama; Toshitaka Suketomo, Kawasaki, all of Japan

[73] Assignee: Kabushiki Kaisha Komatsu Seisakusho, Tokyo, Japan

[21] Appl. No.: 692,110

[22] Filed: June 2, 1976

[30] Foreign Application Priority Data

June 2, 1975 Japan .................................. 50-65275

[51] Int. Cl.² ............................................. B60K 23/00
[52] U.S. Cl. .................................................... 180/77 S
[58] Field of Search ............................. 180/77 S, 6.58; 74/473 R

[56] References Cited

U.S. PATENT DOCUMENTS

| 3,132,486 | 5/1964 | Jonkers | 180/77 S |
| 3,357,513 | 12/1967 | Sundberg | 180/77 S |
| 3,891,003 | 6/1975 | Duttarer | 180/77 S X |

Primary Examiner—Joseph F. Peters, Jr.
Assistant Examiner—R. Schrecengost
Attorney, Agent, or Firm—Armstrong, Nikaido & Marmelstein

[57] ABSTRACT

A vehicle which has a driver's compartment being turnable at an angle of 180° between its forwardly facing position and it rearwardly facing position and a transmission having a plurality of solenoid operated directional control valves for speed change of the vehicle. The transmission is controlled by a transmission control device enabling it to be operated under the same operation manner even when the vehicle travels either in the forward direction or in the rearward direction.

4 Claims, 8 Drawing Figures

VEHICLE WITH ROTATING CAB

BACKGROUND OF THE INVENTION

1. Field of the Invention

The present invention relates to an improvement of a vehicle, and more particularly to a vehicle having a driver's compartment turnable at an angle of 180° between its forwardly facing position and its rearwardly position and a transmission controlled by a transmission control device enabling it to be operated under the same operation manner even when the vehicle runs either in the forward direction or in the rearward direction.

2. Description of the Prior Art

Various vehicles have heretofore been proposed in which a driver's compartment is rotatable at an angle of 180° between its forwardly facing position and its rearwardly facing position so that the driver can look just in the direction of travel of the vehicle without interruption at all times when the vehicle travels forwardly or rearwardly, thereby improving maneuverability of the vehicle. A variable speed change lever for changing the speed and the direction of travel of the vehicle is generally provided in the driver's compartment by which the vehicle is made to travel forwardly when the change lever is shifted into its forward position and when the change lever is shifted into its rearward position. This has led to the drawback that when the driver's compartment is turned at an angle of 180° from the original state thereof and the change lever is manipulated under the same manner as in the original state of the driver's compartment, the vehicle is made to run in an opposite direction. One simple solution to this problem is that the driver favourably manipulates the change lever in response to the forward or the rearward travel of the vehicle. Another solution comprises a pair of change levers to be selectively used for the forward and rearward movements of the vehicle, the levers being respectively located at a forwardly position and at a rearward position in the driver's compartment. An intricate link mechanism is also employed to eliminate the deficiency. However, these prior art attempts are disadvantageous in that the driver finds it difficult to manipulate the change lever with ease, and the speed change system becomes complicated in construction.

The present invention is made to eliminate the foregoing disadvantages of the conventional vehicles.

SUMMARY OF THE INVENTION

A principal object of the present invention is to provide a vehicle which always runs at such a speed ratio as controlled by a transmission of the vehicle and selected by manipulating a single speed change lever in the direction confronted with the driver's compartment even when the driver's compartment is either in its forwardly facing position or its rearwardly facing position.

A another object of the invention is to provide a transmission control device capable of automatically switching the transmission from forward control condition to rearward one and vice versa, when the driver's compartment is turned from a forwardly facing position to a rearwardly facing position.

A still another object of the invention is the provision of a driver's compartment turning device which is simple in structure and can turn the driver's compartment with utmost ease.

To achieve the foregoing objects, a vehicle constructed in accordance with the invention comprises a transmission, a driver's compartment turnable at an angle of 180° from a forwardly facing position to a rearwardly facing position and vice versa, a speed change lever provided in the driver's compartment for operating the transmission, an operation lever provided also in the driver's compartment for turning the driver's compartment, and a transmission control device by which the transmission becomes automatically changed from forward control condition to rearward one simultaneously with the turn of the driver's compartment from the forwardly facing position to the rearwardly facing position by the operation of the driver's compartment operation lever, and vice versa.

BRIEF DESCRIPTION OF THE DRAWINGS

Above and other objects, features and advantages of the invention will become apparent from the following description taken in conjunction with the accompanying drawings in which.

DETAILED DESCRIPTION OF THE PREFERRED EMBODIMENTS

Figure 1:
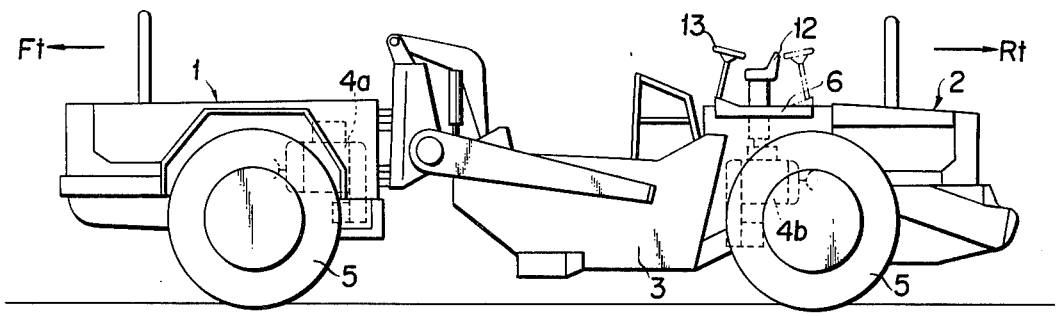
FIG. 1 is a schematic side elevational view of a vehicle as one embodiment of the present invention.

Reference is now made to FIG. 1, which shows a preferred embodiment of the invention, there is provided a front section 1, a rear section 2, and a vertically movable scraper bowl 3 interposed between the front and rear sections 1 and 2, thereby forming a motor scraper. The front and rear sections 1 and 2 are respectively provided with their respective transmission 4a and 4b coupled with an engine or prime mover, not shown, the transmission 4a and 4b being capable of respectively driving wheels 5, 5 of the front and rear sections. The rear section 2 is provided with a driver's compartment 6 turnable at an angle of 180° between a forwardly facing position $F_C$ and a rearwardly facing position $R_C$.

Figure 2:
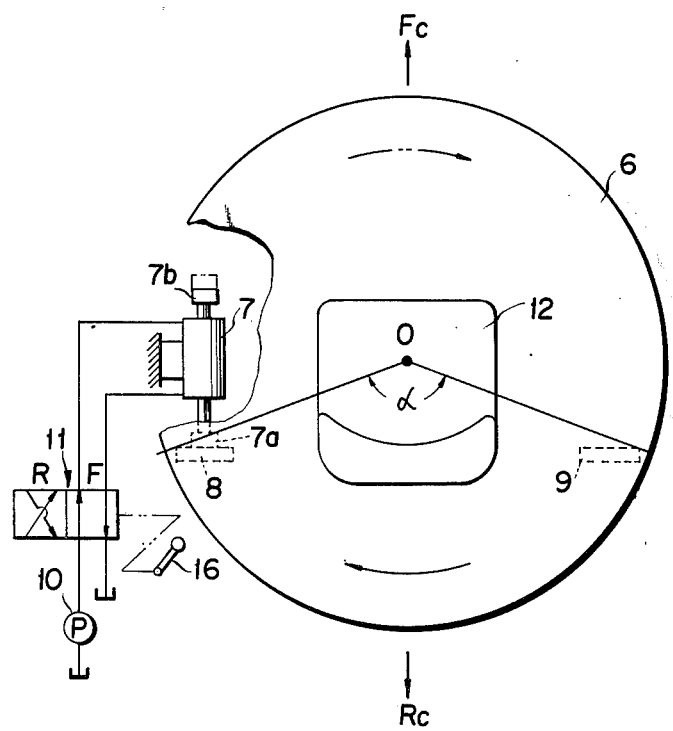
FIG. 2 is a schematic partially cut away plan view of a driver's compartment and its turning device according to the invention.
Figure 3:
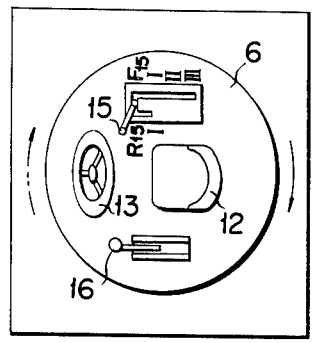
FIG. 3 is a schematic plan view of a driver's compartment.
Figure 4:
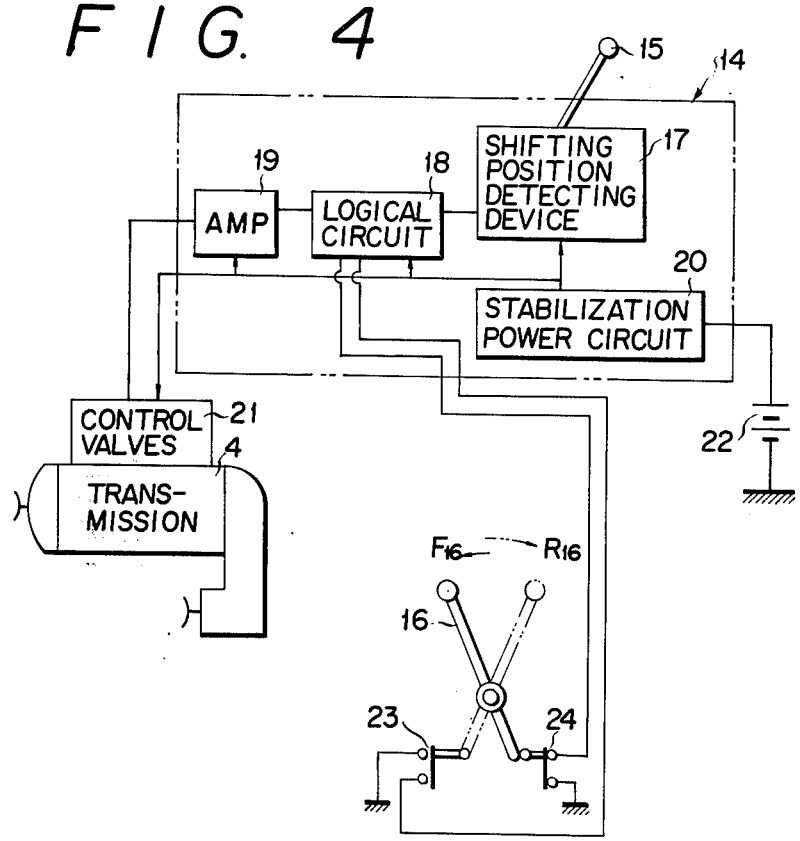
FIG. 4 is a block diagram of a transmission control device constructed in accordance with the invention.

According to an embodiment shown in FIG. 2, the vehicle has a double acting hydraulic actuator 7 in the vicinity of the driver's compartment 6. The double acting hydraulic actuator 7 has a hydraulic cylinder fixedly secured to a chassis of the vehicle and pair of extensible and retractable piston rods 7a, 7b respectively associated with both ends of the hydraulic cylinder. On the other hand, the driver's compartment 6 has its center axis O and is provided with a pair of stopper pieces 8, 9 fixedly secured to the underside of the floor thereof as having relation to each other at an angle of α degree with respect to the axis O. Thus, when the piston rod 7a is extended so as to urge the stopper piece 8, the driver's compartment is turned around the axis O by a reaction caused upon the urge of the piston rod 7a to the stopper piece 8. Consequently, when the driver's compartment is turned at an angle of 180° from the original position thereof, it is stopped by the abutment of the other piston rod 7b against the other stopper piece 9. The double acting hydraulic actuator 7 is supplied with hydraulic oil introduced from an hydraulic pump 10 and passing through a directional control valve 11. The directional control valve 11 is operated by a driver's compartment operation lever 16 provided in the driver's compartment 6. As shown in FIG. 3, the driver's compartment 6 is provided with a seat 12, a steering handle 13 coupled with a steering mechanism via a known directional control valve, not shown, which is used to prevent the steering handle from being reversely manipulated in the forward or rearward travel of the vehicle, and a speed change lever 15 operatively connected to a transmission control device 14 shown in FIG. 4. The speed change lever 15 can be operated to be moved across and held at positions of first speed I, second speed II, third speed III, forward movement $F_{15}$, rearward movement $R_{15}$, and neutral N. The transmission control device 14 comprises a position detecting mechanism 17 operable by the speed change lever 15, a logical circuit 18 for being actuated by the operation of the position detecting mechanism 17 and the driver's compartment operation lever 16, a power amplifier 19, and a stabilization power supply circuit 20. The output of the power amplifier 19 is supplied to a directional control valve group 21 for variable speed change of the vehicle. The stabilization power supply circuit 20 is connected to a battery 22 on the vehicle. When the driver's compartment operation lever 16 is operated, the directional control valve 11 is actuated, and simultaneously first and second switches 23 and 24 is selectively actuated as shown in FIG. 4. These switches 23, 24 are coupled with the logical circuit 18. When the driver's compartment operation lever 16 is manipulated to shift the directional control valve 11 to its forward position F, the second switch 24 is turned ON, and when the lever 16 is operated to shift the valve 11 to its rearward position R, the first switch 23 is turned ON.

Figure 5:
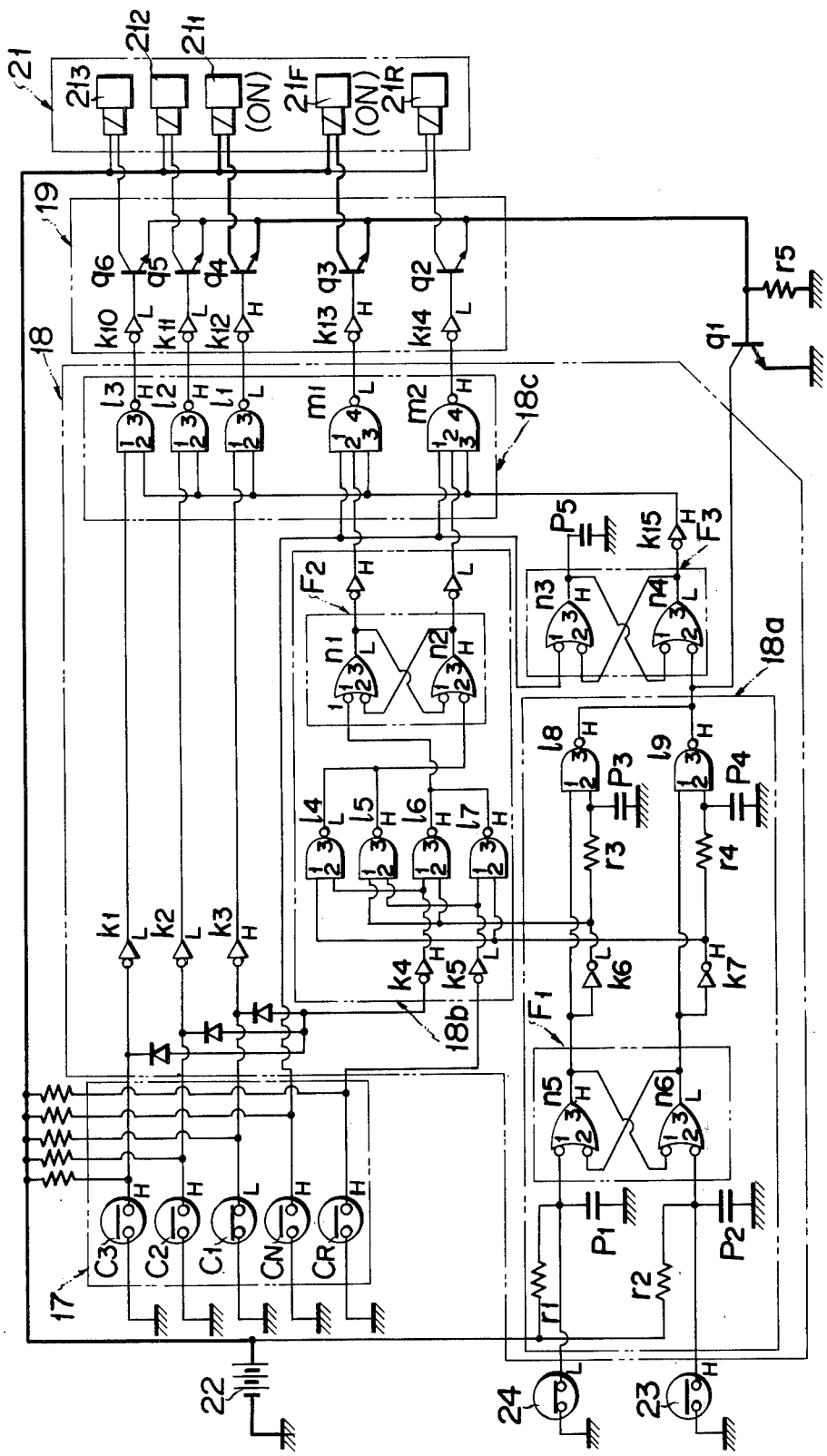
FIGS. 5 through 8 are circuit diagrams illustrative of the way in which the transmission control device is operated according to the invention.

FIG. 5 illustrates an arrangement of the transmission control device 14 having the position detecting mechanism 17, the logical circuit 18, the power amplifier 19, and the directional control valve group 21 for the transmission 4. The position detecting mechanism 17 has a plurality of switches $C_1$, $C_2$, $C_3$, $C_N$, and $C_R$ which are turned ON or OFF in accordance with a selected position of the speed change lever 15. The logical circuit 18 has a forward-rearward switch circuit 18a, a forward-rearward detecting circuit 18b, and a NAND circuit 18c. The power amplifier 19 has a plurality of power transistors $q_2$, $q_3$, $q_4$, $q_5$, and $q_6$. The directional control valve group 21 includes a solenoid operated valve $21_3$ for the first speed, a solenoid operated valve $21_2$ for the second speed, a solenoid operated valve $21_1$ for the first speed, a solenoid operated valve $21_F$ for the forward movement, and a solenoid operated valve $21_R$ for the rearward movement.

A mode of operation of the transmission control device 4 of the invention and structural details thereof will be described.

FORWARD MOVEMENT OF THE VEHICLE

To move the vehicle in the normal forward direction $F_r$, the driver's compartment operation lever 16 is manipulated to the forward position $F_{16}$, as shown in FIG. 4, to set the directional control valve 11 in the forward position F, thereby extending the piston rod 7b of the double acting hydraulic actuator 7 so as to enable the driver's compartment 6 to assume the forwardly facing position shown in FIG. 2. At the same time, the second switch 24 is switched ON. Upon shifting the speed change lever 15 to the first speed position I, the first speed switch $C_1$ of the position detecting mechanism 17 is switched ON. A small current, hereinafter represented by a signal L, which is smaller than an operating current for the power transistors $q_1$ to $q_6$ flows from the switch $C_1$, the signal L being converted by an inverter $k_3$ in the logical circuit 18 into another small current, hereinafter represented by a signal H, which is larger than the operating current for the power transistors $q_1$ to $q_6$. Thus, the signal H being applied to a gate $l_{1-1}$ as an input. The signal L is also converted by an inverter $k_4$ into the signal H which is then applied as an input to gates $l_{4-2}$ and $l_{6-1}$. As the second switch 24 is switched ON, the signal L is generated therethrough which is then applied to a gate $n_{5-1}$ of a first flip-flop circuit $F_1$ of the forward-rearward switch circuit 18a. Since the first switch 23 is held OFF, the signal H is applied to a gate $n_{6-2}$ of the first flip-flop circuit $F_1$ as an input. Therefore, the signal H and the signal L are set of gates $n_{5-3}$ and $n_{6-3}$, respectively. The output signal L from the gate $n_{6-3}$ is applied to a gate $l_{9-1}$ of the forward-rearward switch circuit 18a as an input, and the signal L which is directed to an inverter $k_7$ is converted by the inverter $k_7$ into the signal H which is then applied as an input to gates $l_{4-1}$ and $l_{7-2}$ of the forward-rearward detecting circuit 18b, and to a gate $l_{9-2}$. The output signal H from the gate $n_{5-3}$ is applied to a gate $l_{8-1}$ of the forward-rearward switch circuit 18a as an input, and the signal H which is directed to an inverter $k_6$ is converted by the inverter $k_6$ into the signal L which is then applied to gates $l_{5-1}$ and $l_{6-2}$ of the forward-rearward detecting circuit 18b as an input, and to a gate $l_{8-2}$ as an input. Inverters $k_1$, $k_2$ and $k_5$ have outputs of signal L because their respective inputs are of signal H due to all OFF of the switches $C_3$, $C_2$ and $C_R$, so that the signal L is applied to gates $l_{2-1}$, $l_{3-1}$, $l_{5-2}$, and $l_{7-1}$ as an input. Therefore, a gate $l_{4-3}$ has an output of signal L, and gates $l_{5-3}$, $l_{6-3}$, $l_{7-3}$, $l_{8-3}$, and $l_{9-3}$ have outputs of signal H. The signals H from the gates $l_{8-3}$ and $l_{9-3}$ are sent to a gate $n_{4-2}$ in a third flip-flop circuit $F_3$ as an input. Since the switch $C_N$ is held OFF, the signal H is applied as an input to a gate $n_{3-1}$ in the third flip-flop ciruit $F_3$. Therefore, an output of signal L appears on a gate $n_{4-3}$ in the third flip-flop circuit $F_3$, the output signal L being converted by an inverter $k_{15}$ into the signal H that is then applied as an input to gates $l_{1-2}$, $l_{2-2}$, $m_{1-3}$ and $m_{2-3}$ in the NAND circuit 18c. The forward-rearward detecting circuit 18b has a second flip-flop circuit $F_2$ including gates $n_{1-1}$ and $n_{2-2}$ to which are respectively applied the signals H and L. Therefore, the signals L and H are set on gates $n_{1-3}$ and $n_{2-3}$ of the second flip-flop circuit $F_2$, respectively. The output signal L from a gate $n_{1-3}$ converted by an inverter $k_8$ into the signal H which is then applied to a gate $m_{1-2}$ in the NAND circuit 18c, and the output signal H from a gate $n_{2-3}$ is converted by an inverter $k_9$ into the signal L which is then applied to a gate $m_{2-2}$ in the NAND circuit 18c. Since the switch $C_N$ is held OFF, the signal H is sent to gates $m_{1-1}$ and $m_{2-1}$ in the NAND circuit 18c.

As a consequence, the output signal L is set on gates $l_{1-3}$ and $m_{1-4}$ in the NAND circuit 18c. On the other hand, the output signal H is set on other gates $l_{2-3}$, $l_{3-3}$, and $m_{2-4}$. The output signal L from the gate $l_{1-3}$ is converted by an inverter $k_{12}$ into the signal H which is then applied to and energizes the power transistor $q_4$, when a current flows from the battery 22 through the first speed solenoid operated valve 21, the power transistor $q_4$, thence through a power transistor $q_1$ and a resistance $r_5$ which are connected in parallel, to the ground, as indicated by thick solid lines in FIG. 5. The solenoid operated valve $21_1$ is actuated to supply hydraulic pressure to a clutch for the first speed, not shown, in the transmission 4, whereby the latter becomes coupled with a prime mover or engine of the vehicle at a ratio of the first speed. Concurrent with this, the output signal L from the gate $m_{1-4}$ is converted by an inverter $k_{13}$ into the signal H which then energizes the power transistor $q_3$, when a current flows from the battery 22 through the forward solenoid operated valve $21_F$, the power transistor $q_3$, thence through the parallel-connected power transistor $q_1$ and resistance $r_5$ to the ground, as indicated by thick solid lines in FIG. 5. The solenoid operated valve $21_F$ is actuated to supply hydraulic pressure to a clutch for the forward movement, not shown, in the transmission 4, whereby the transmission 4 becomes coupled with the engine of the vehicle so as to move the latter forwardly. The vehicle thus travels at the first speed and in the forward direction as shown in FIG. 1.

When the speed change lever 15 is further manipulated into the positions II and III, the vehicle is moved at the second and third speed ratios, respectively, in the forward direction F.

REARWARD MOVEMENT OF THE VEHICLE

Figure 6:
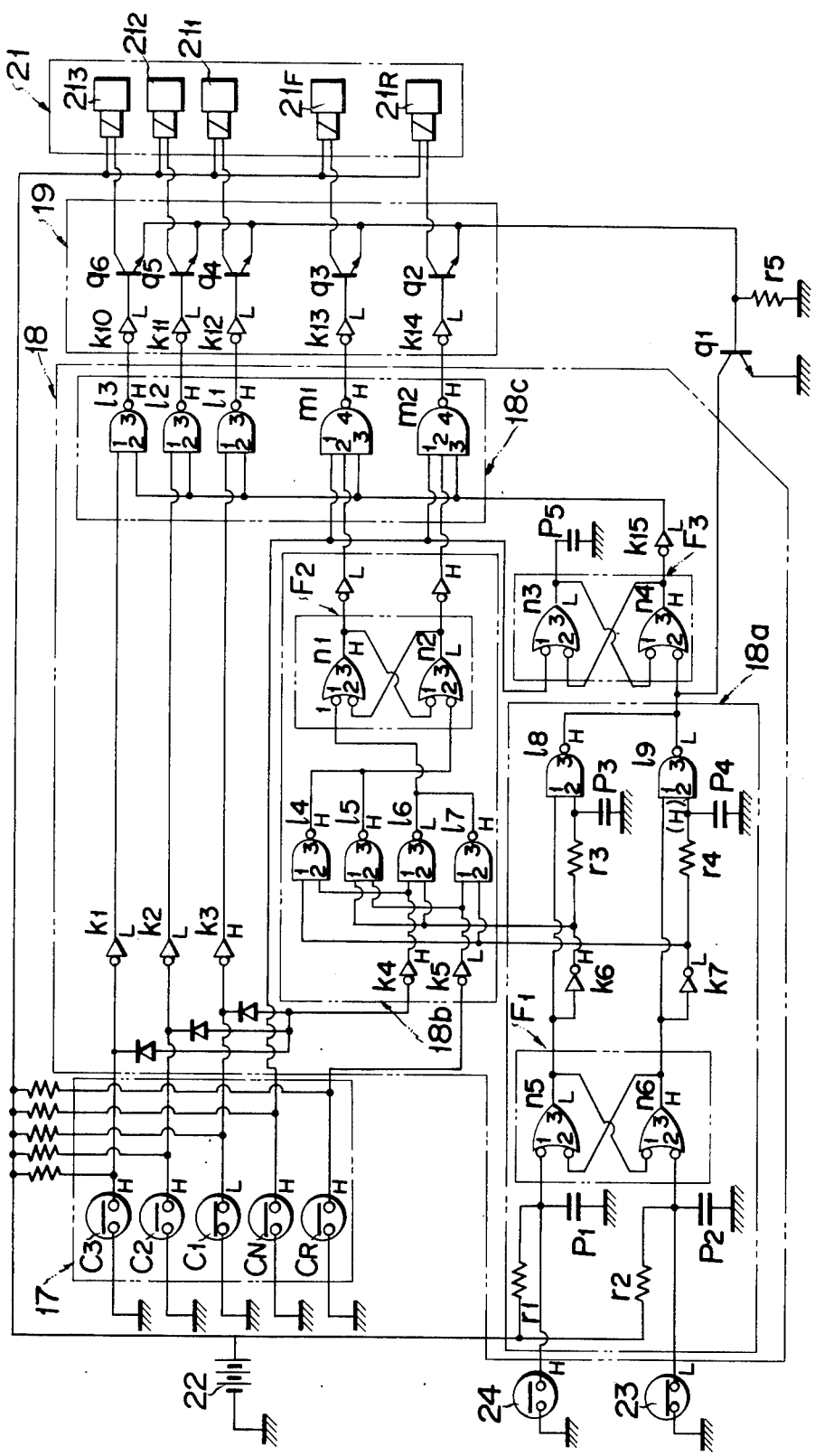

With the parts held in the positions of FIGS. 1, 2 and 5, that is, under forwardly moving conditions, the driver's compartment operation lever 16 is shifted to the rearwardly moving position $R_{16}$ in order to switch the valve 11 to the rearward position, whereupon the piston rod 7a of the double acting hydraulic actuator 7 is extended to turn the driver's compartment 6 into the rearwardly facing position $F_C$. At the same time, the second switch 24 is switched OFF and the first switch 23 is switched ON. The FIG. 6, only the first speed switch $C_1$ in the position detecting mechanism 17 is held ON because the speed change lever 15 is located in the first speed position I. Input and output signal flows to and from respective gates in FIG. 6 are readily understood from the foregoing description with respect to FIG. 5, and hence its detailed discussion is omitted. However, it is to be noted that the reason why an input signal to the gate $l_{9-2}$ in the forward-rearward switch circuit $18a$ remains being the signal H instead of the signal L due to an output signal from the inverter $k_7$ is that a capacitor $P_4$ has been charged by the signal H when under the conditions of FIG. 5. Even if the input signal to the gate $l_{9-2}$ is changed to the signal L upon discharge of the capacitor $P_4$, the output signal H from the gate $n_{4-3}$ in the third flip-flop circuit remains unchanged. Mere manipulation of the lever 16 to the rearwardly moving position from the conditions of FIG. 5 results in the input signals L to all the power transistors $q_2$ through $q_6$ which then remain de-energized, as will be apparent from the conditions shown in FIG. 6. In this instance, any of the solenoid operated valves $21_1$, $21_2$, $21_3$, $21_F$, and $21_R$ is not activated, so that the transmission 4 is held in the neutral position and the vehicle remains stopped though the speed change lever 15 is held in the first speed position I.

Figure 7:
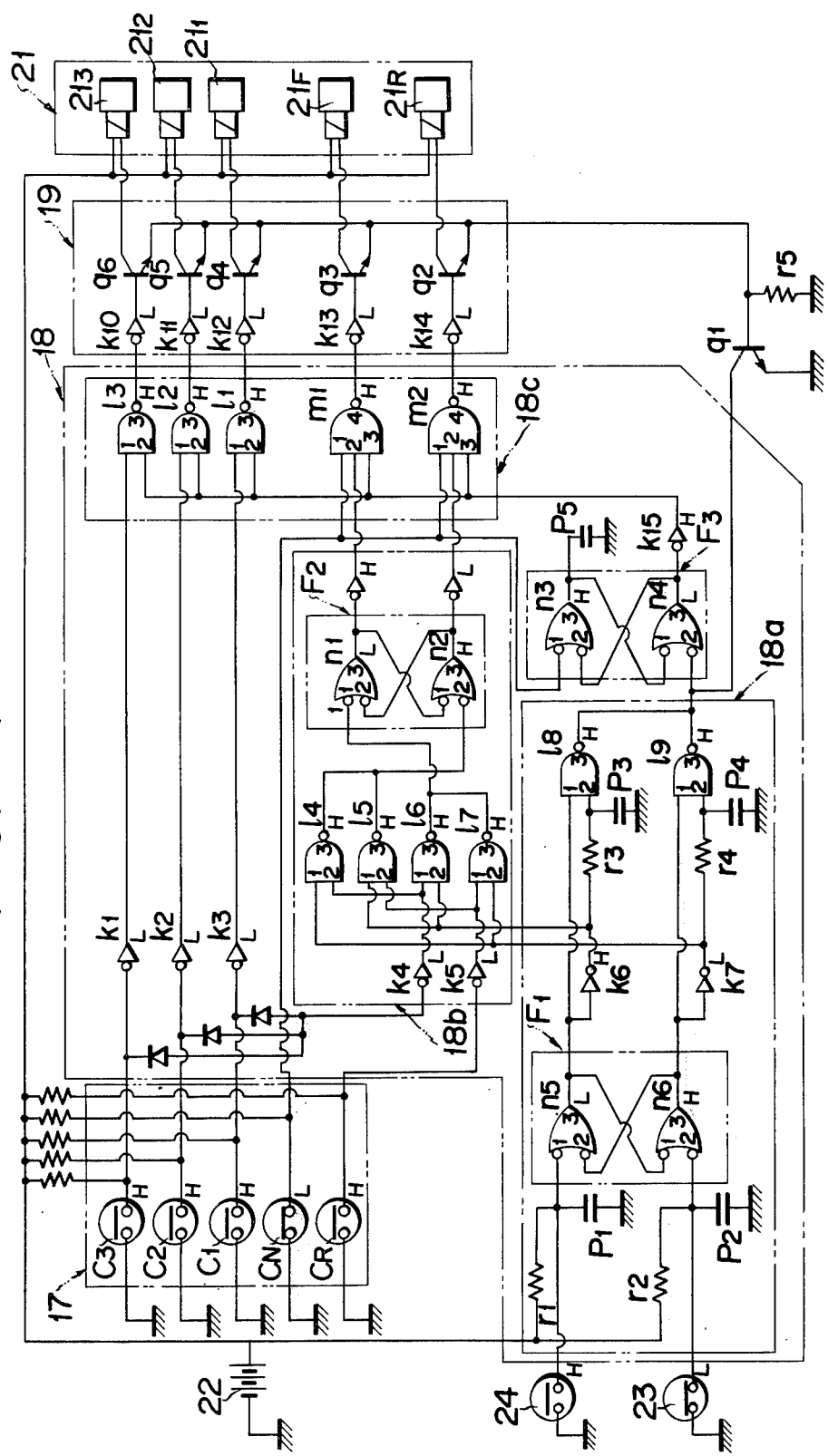
Figure 8:
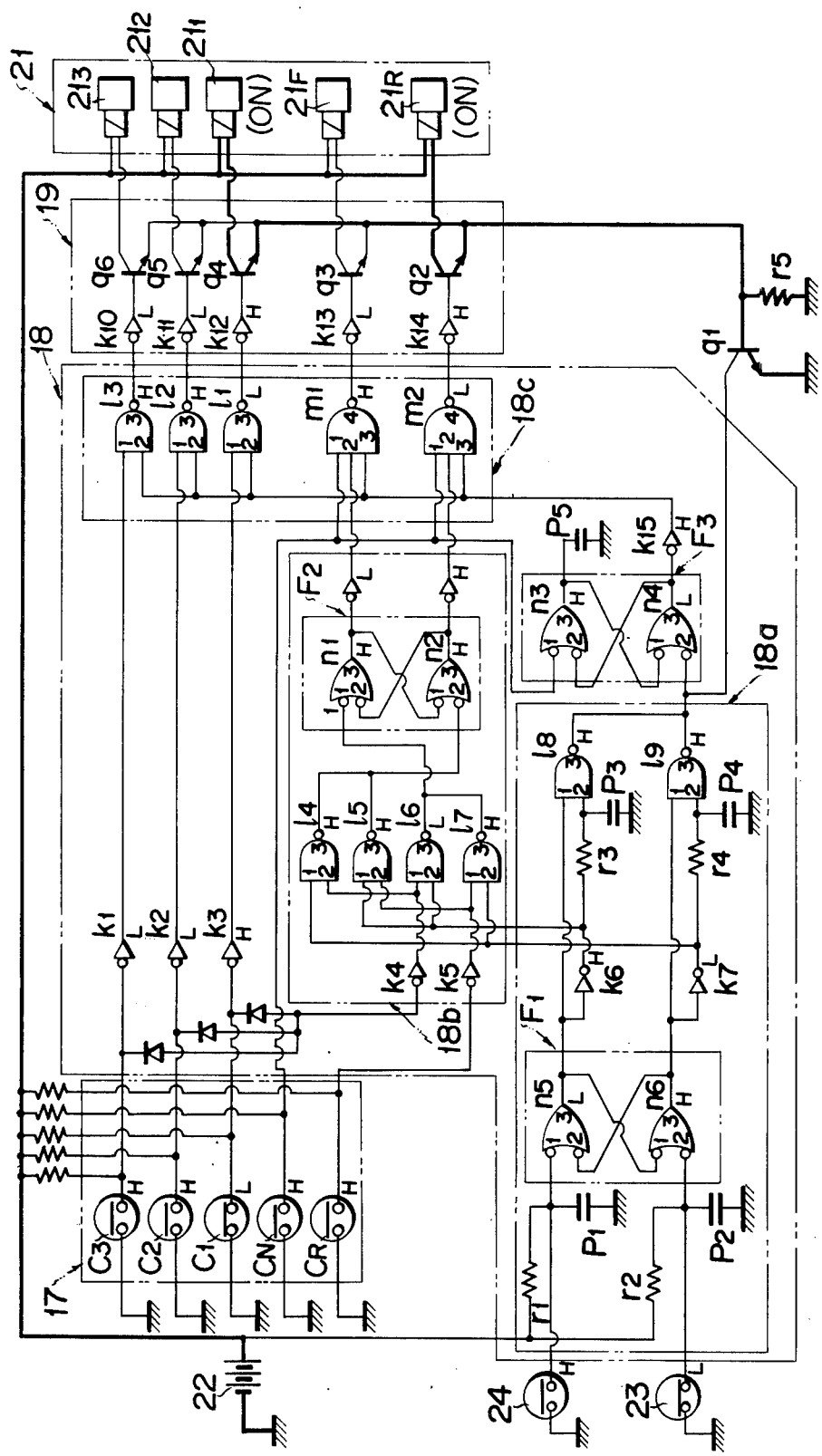

In order for the vehicle to move rearwardly out of the conditions of FIG. 6, the speed change lever 15 is first returned to the neutral N as shown in FIG. 7 and then manipulated to the first speed position I again as shown in FIG. 8.

More specifically, when the speed change lever 15 is returned to the neutral N, the neutral switch $C_N$ in the position detecting mechanism 17 is switched ON and the signal L flows, as shown in FIG. 7. Thus, the signal L is applied as an input signal to the gates $m_{1-1}$ and $m_{2-1}$ in the NAND circuit $18c$ and the gate $n_{3-1}$ in the third flip-flop circuit $F_3$. On the other hand, the signal from the switch $C_1$ is changed to the signal H since the first speed switch $C_1$ becomes OFF which has been ON in FIG. 6. As shown in FIG. 7, all the input signals to the power transistors $q_2$ through $q_6$ in the power amplifier 19 become the signals L, the power transistors $q_2$ through $q_6$ being de-energized. Accordingly, the vehicle remains still stopped.

Then, the speed change lever 15 is manipulated to the first speed position I again, when the neutral switch $C_N$ is switched OFF and the first speed switch $C_1$ is switched ON. Since the ON-OFF conditions of the switches 23 and 24 in FIG. 8 are held in opposite relation to those in FIG. 5, the outputs from the inverters $k_8$ and $k_9$ in the forward-rearward detecting circuit $18b$ is opposite to those in FIG. 5 accordingly, though an output signal from the inverter $k_{15}$ is the signal H which is the same as in the case of FIG. 5. That is, an output signal from the inverter $k_8$ is the signal L and that from the inverter $k_9$ is the signal H. The power transistor $q_3$ in the power amplifier 19 is held de-energized and the power transistors $q_2$ and $q_4$ are energized, whereupon a current is fed from the battery 22 through the solenoid operated valve $21_R$, the power transistor $q_2$, thence through the parallel-connected power transistor $q_1$ and resistance $r_5$ to the ground, as indicated by thick solid lines in FIG. 8. The solenoid operated valve $21_R$ is then actuated to supply hydraulic pressure to a rearwardly movement clutch, not shown, in the transmission 4 to couple the vehicle engine with wheel members so as to move the vehicle rearwardly. Simultaneously, a current is also fed from the battery 22, through the solenoid operated valve $21_1$, the power transistor $q_4$, thence through the parallel-connected power transistor $q_1$ and resistance $r_5$ to the ground as indicated by thick solid lines in FIG. 8. The solenoid operated valve $21_1$ is then actuated to supply hydraulic pressure to the unshown first speed clutch in the transmission 4 to couple the vehicle engine with the wheel members at the ratio of first speed. The vehicle thus travels in the rearward direction R and at the first speed with the driver's compartment 6 having its forwardly facing position oriented in the direction of rearward movement of the vehicle.

When the speed change lever 15 is further manipulated into the positions II and III, the vehicle is moved at the second and third speeds, respectively, in the rearward direction $R_r$.

With this arrangement, the vehicle can always travel at such a speed ratio as selected by the speed change lever 15 in the direction confronted with the driver's compartment even when the driver's compartment is either in the forward facing position or the rearward facing position, with the results that, the operator or driver can watch a forward portion opposite to a direction of travel of the vehicle properly at all times and drive the vehicle with maximum ease since only one speed change lever will suffice to be manipulated under the same manner even when the vehicle is travelled either in the forward or rearward direction.

What is claim is:

1. In a vehicle which is provided therein with a driver's compartment mounted to enable it to be turned at an angle of 180° from its forwardly facing position to its rearwardly facing position and vice versa and a multispeed transmission having a plurality of forward speeds and at least one rearward speed said transmission including a plurality of solenoid operated directional control valves for speed change of the vehicle, the improvement comprising:

a. a change lever provided in said driver's compartment for operating said transmission;
   b. an operation lever means provided in said driver's compartment for turning said driver's compartment; and
   c. transmission control means by which said transmission becomes automatically changed from a forward control condition to a rearward control condition when said driver's compartment is turned from the forwardly facing position to the rearward facing position by the operation of said driver's compartment operation lever wherein said transmission has a plurality of rearward speeds and at least one forward speed, and vice versa; whereby said vehicle has a multispeed transmission controlled by the operation of said change lever in the direction said driver's compartment is facing even when the driver's compartment is either in the forwardly facing position or in the rearwardly facing position.

2. A vehicle as set forth in claim 1, wherein said transmission control means comprises:

a. a position detecting mechanism for detecting a position of said change lever;
   b. a logical circuit electrically connected to said detecting mechanism and actuated by directions dependent on both operations of said change lever and said driver's compartment operation lever means;
   c. a power amplifier for amplifying outputs from said logical circuit so as to operate said solenoid operated directional control valves of the transmission; and
   d. a stabilization power supply circuit provided between an electric power source and said electric detecting mechanism.

3. The vehicle as set forth in claim 2, wherein said logical circuit comprises a forward-rearward switch circuit, a forward-rearward detecting circuit, and a NAND circuit.

4. The vehicle as set forth in claim 1, wherein said operation lever means includes a. an operating lever;
   b. a double acting hydraulic actuator operatively coupled to said operating lever and having a hydraulic cylinder fixedly secured to a chassis of said vehicle and a pair of extensible and retractable piston rods respectively associated with both ends of said cylinder; and
   c. a pair of stopper pieces each being fixedly secured to the underside of the floor of said driver's compartment at a symmetrical position to each other with respect to a longitudinal center line of the driver's compartment; wherein said driver's compartment is turned around its center axis by a reaction caused upon urging one of said pair of stopper pieces with one of said piston rods, and wherein said driver's compartment is stopped due to the abutment of the other stopper piece against the other piston rod when the driver's compartment is turned at an angle of 180° from its original position.

* * * * *